No. 841,641. PATENTED JAN. 15, 1907.
J. DEGEN.
MEANS FOR BALANCING CENTRIFUGAL PUMPS.
APPLICATION FILED JUNE 29, 1905.

7 SHEETS—SHEET 1.

Witnesses:
John H. Lynch
Ned W. Barnsdel

Inventor:
Julius Degen.
By his attorney:
F. H. Richards.

No. 841,641. PATENTED JAN. 15, 1907.
J. DEGEN.
MEANS FOR BALANCING CENTRIFUGAL PUMPS.
APPLICATION FILED JUNE 29, 1905.

7 SHEETS—SHEET 3.

Witnesses:
Fred W. Bunnell
C. C. Fuss.

Inventor:
Julius Degen,
By his attorney,
F. H. Richards.

No. 841,641.  PATENTED JAN. 15, 1907.

J. DEGEN.
MEANS FOR BALANCING CENTRIFUGAL PUMPS.
APPLICATION FILED JUNE 29, 1905.

7 SHEETS—SHEET 4.

Witnesses:   Inventor:
Fred W. Barnacle,   Julius Degen,
C. C. Fuss.   By his attorney,
  F. H. Richards.

No. 841,641. PATENTED JAN. 15, 1907.
J. DEGEN.
MEANS FOR BALANCING CENTRIFUGAL PUMPS.
APPLICATION FILED JUNE 29, 1905.

7 SHEETS—SHEET 5.

Witnesses:

Inventor:
Julius Degen,
By his attorney
F. H. Richards.

No. 841,641. PATENTED JAN. 15, 1907.
J. DEGEN.
MEANS FOR BALANCING CENTRIFUGAL PUMPS.
APPLICATION FILED JUNE 29, 1905.

7 SHEETS—SHEET 6.

Witnesses:

Inventor:
Julius Degen
By his attorney,
F H Richards.

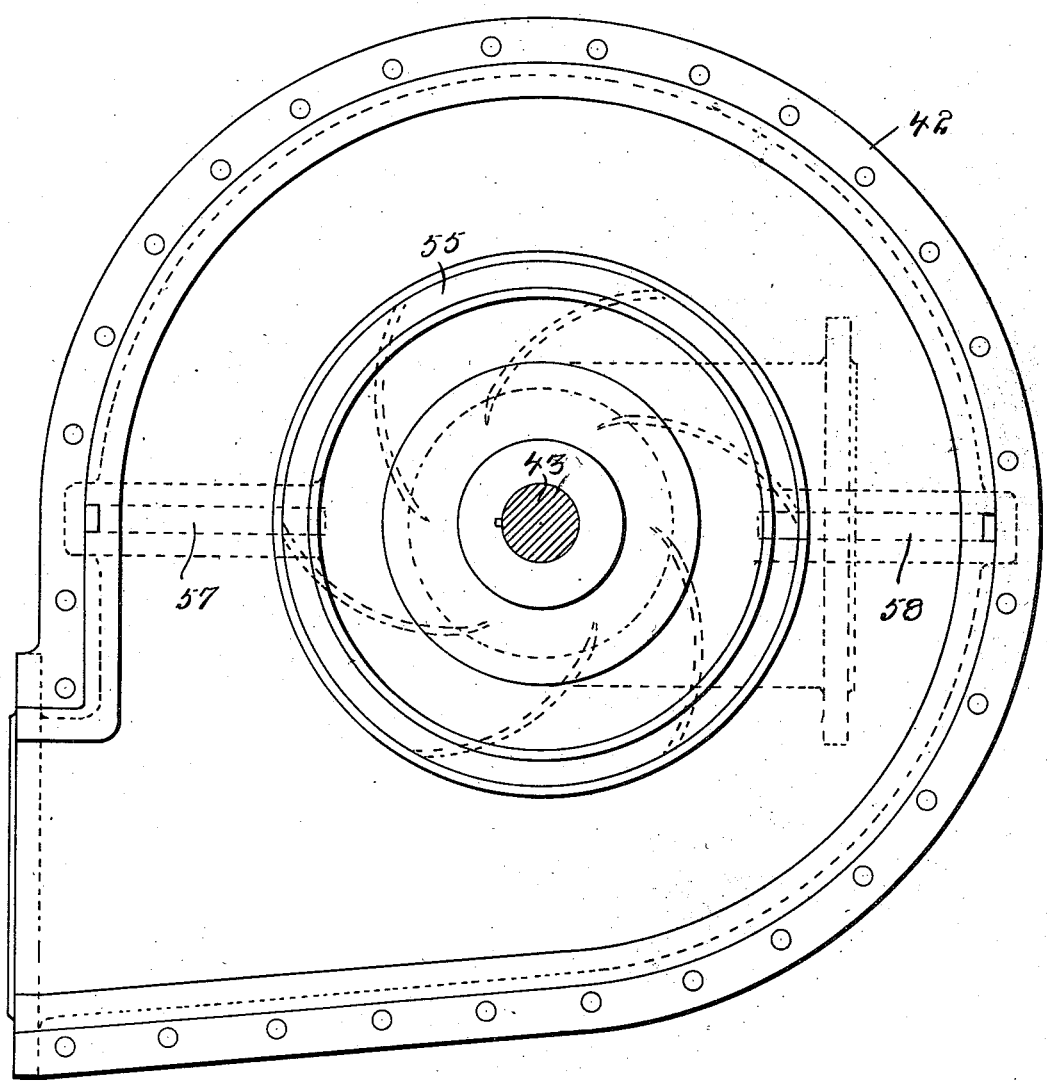

UNITED STATES PATENT OFFICE.

JULIUS DEGEN, OF TRENTON, NEW JERSEY, ASSIGNOR, BY MESNE ASSIGNMENTS, TO LEA-DEGEN PUMP COMPANY, OF TRENTON, NEW JERSEY, A CORPORATION OF NEW JERSEY.

MEANS FOR BALANCING CENTRIFUGAL PUMPS.

No. 841,641.      Specification of Letters Patent.      Patented Jan. 15, 1907.

Application filed June 29, 1905. Serial No. 267,497.

*To all whom it may concern:*

Be it known that I, JULIUS DEGEN, a citizen of the Republic of Switzerland, residing in Trenton, in the county of Mercer and State of New Jersey, have invented certain new and useful Improvements in Means for Balancing Centrifugal Pumps, of which the following is a specification, reference being had to the accompanying drawings, in which are illustrated one embodiment of my invention.

Figure 1:
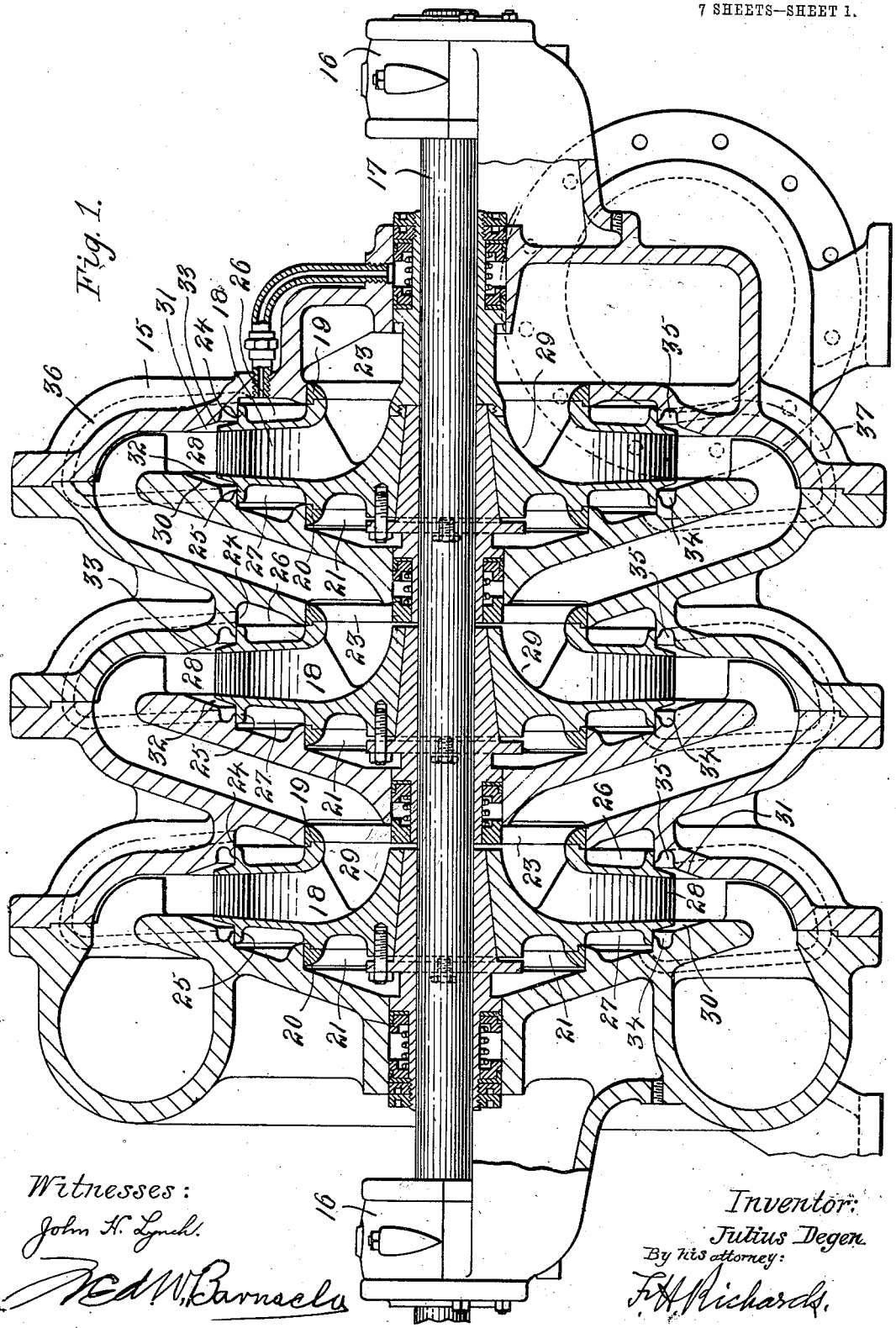
Figure 2:
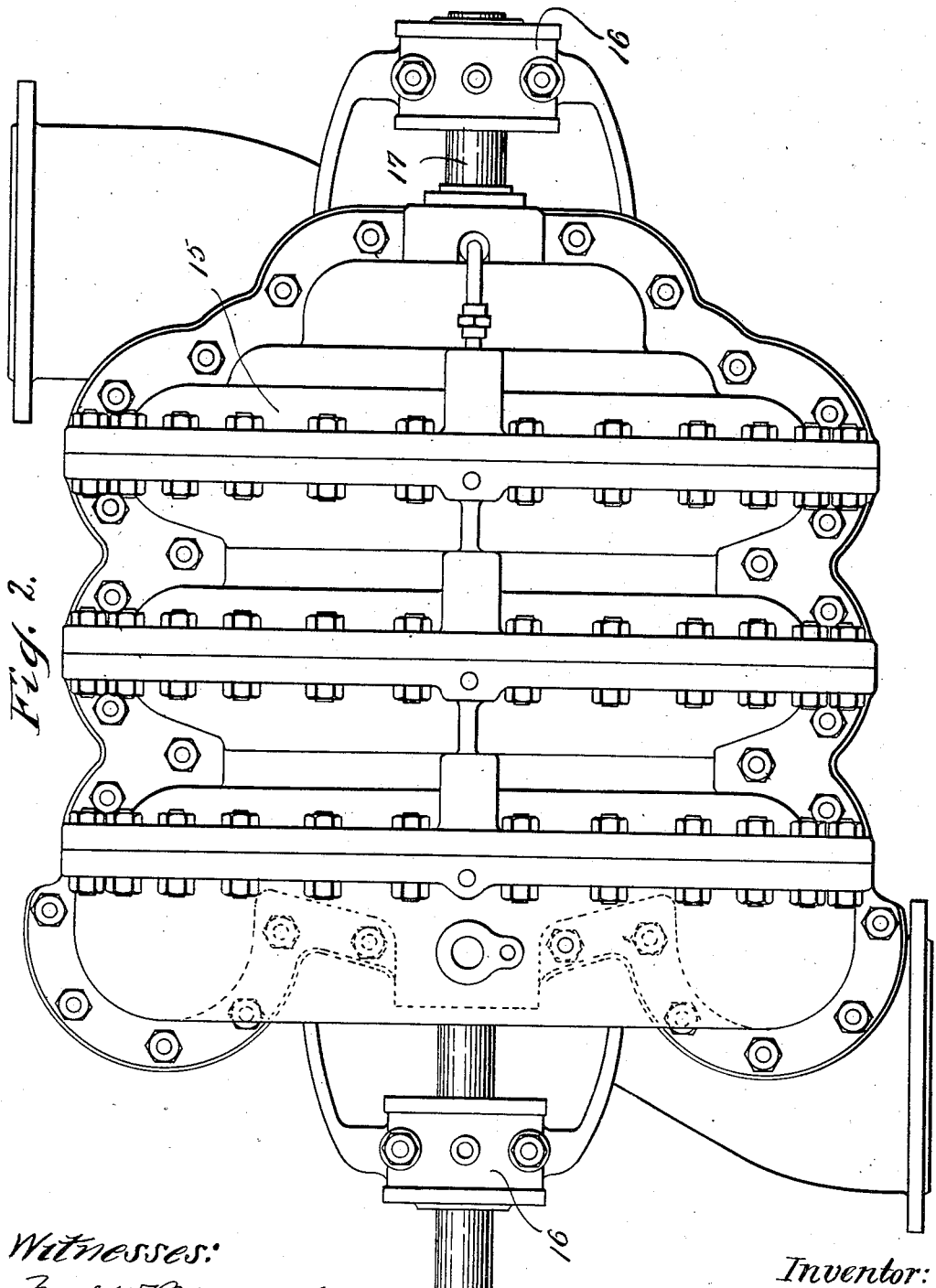
Figure 3:
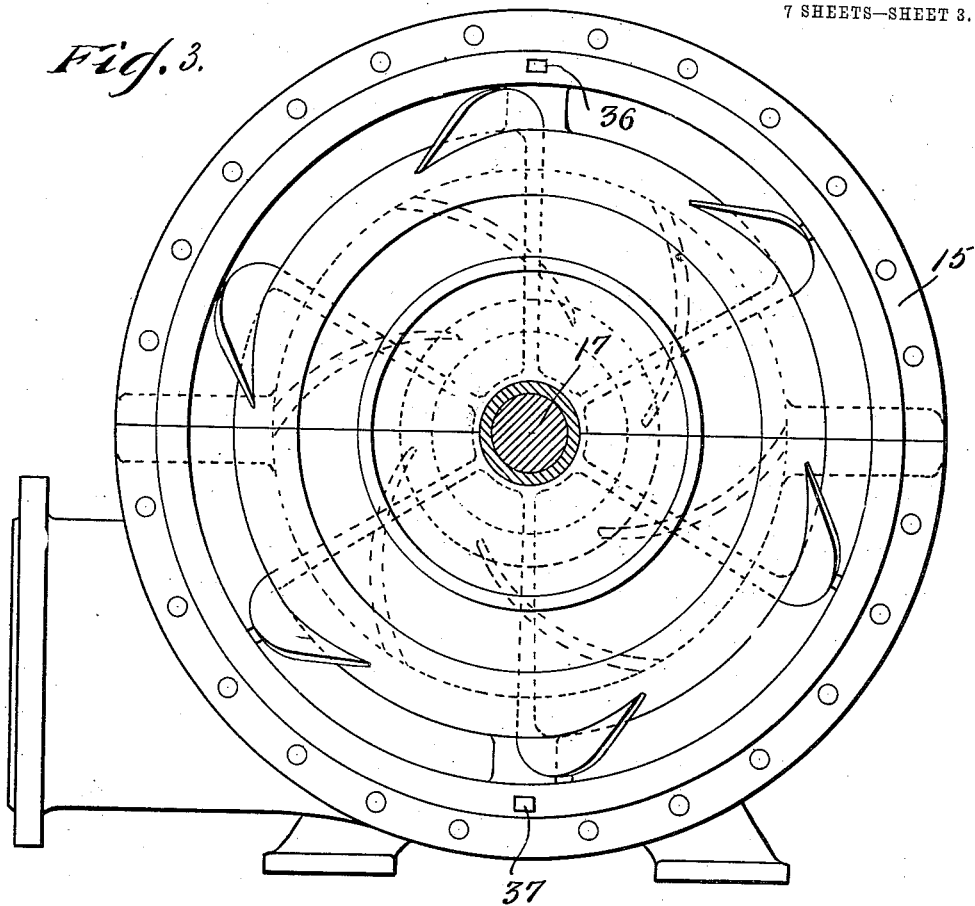
Figure 4:
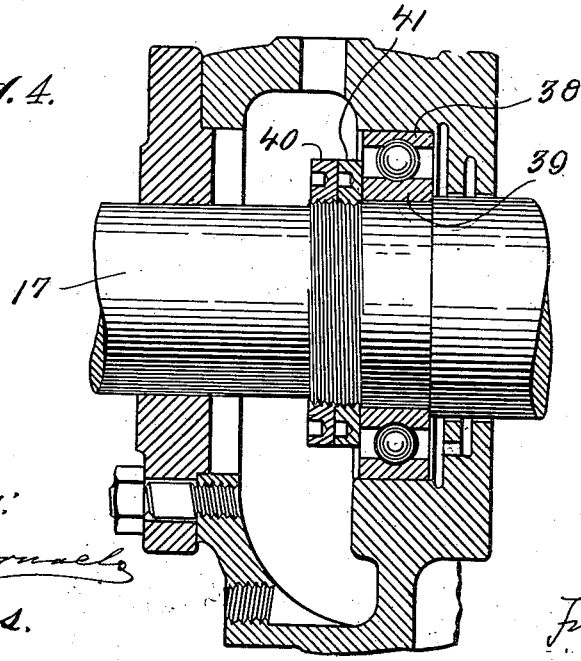
Figure 5:
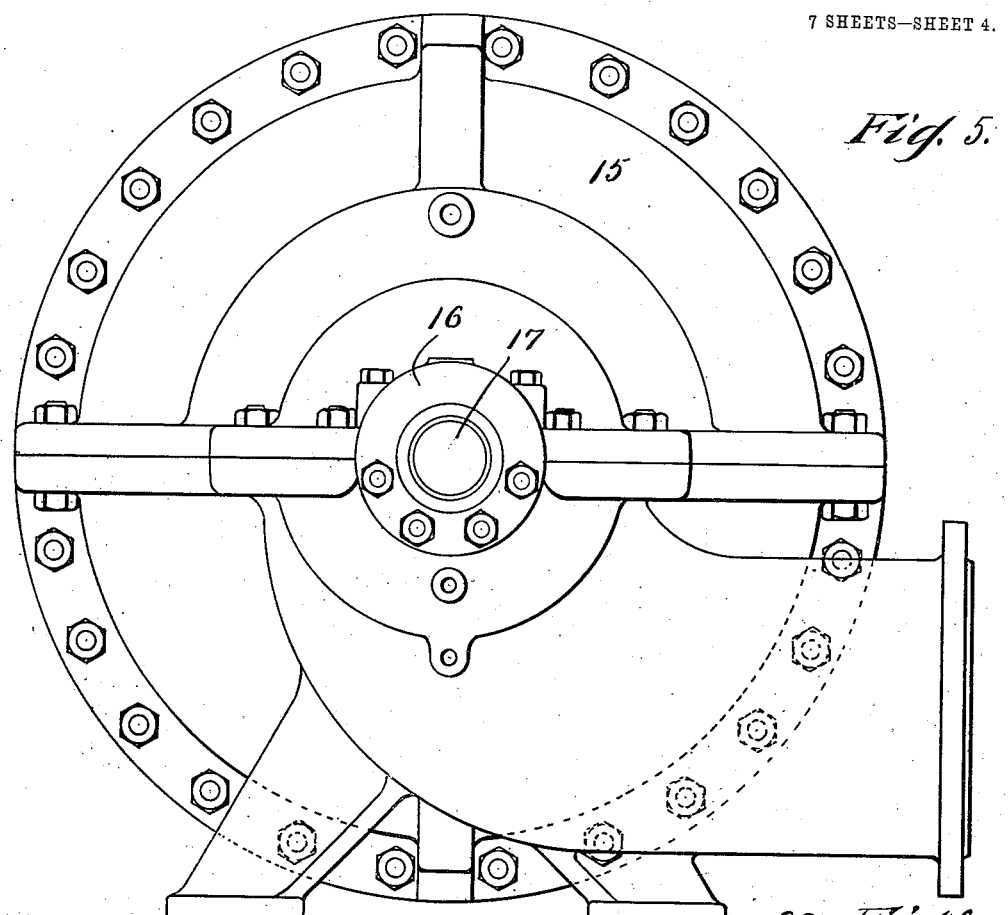
Figures 6, 7:
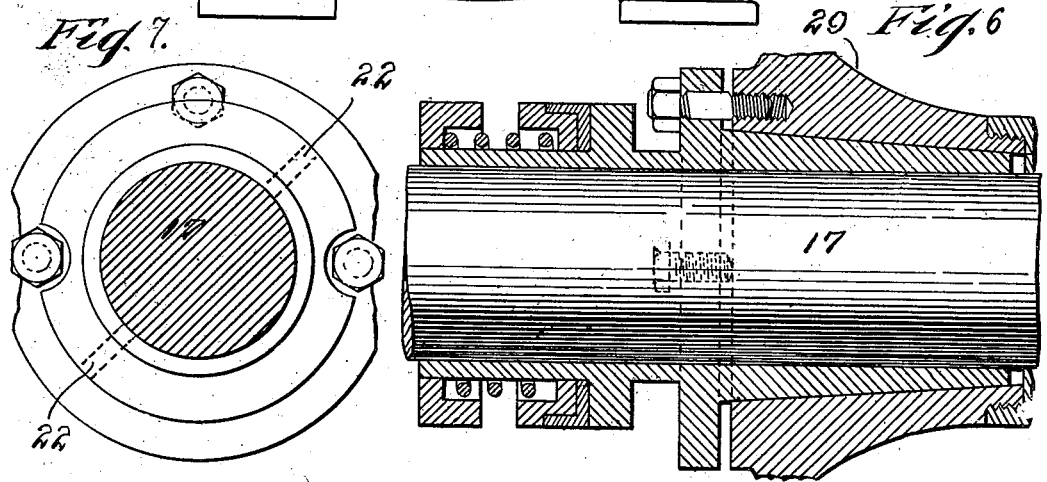
Figure 8:
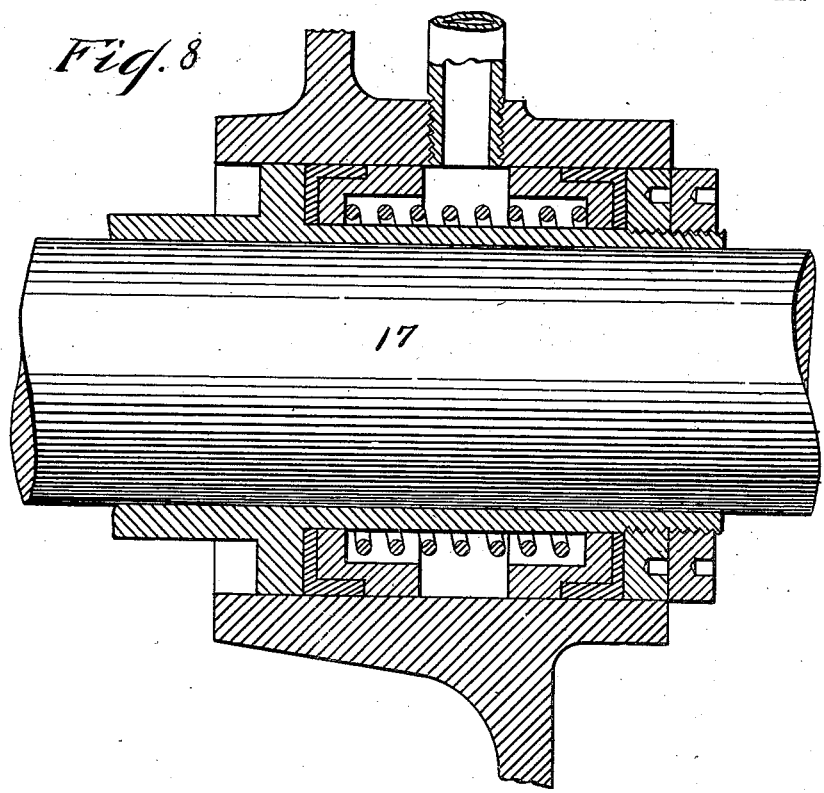
Figure 9:
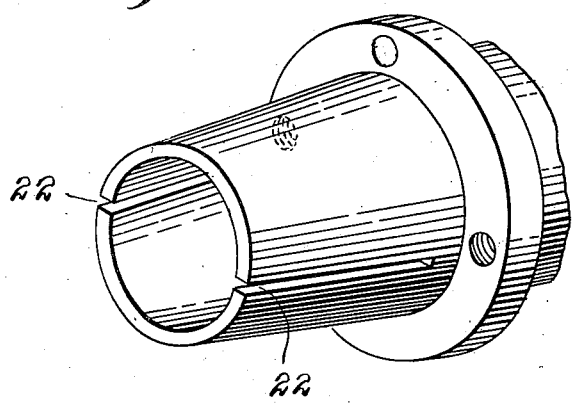
Figure 10:
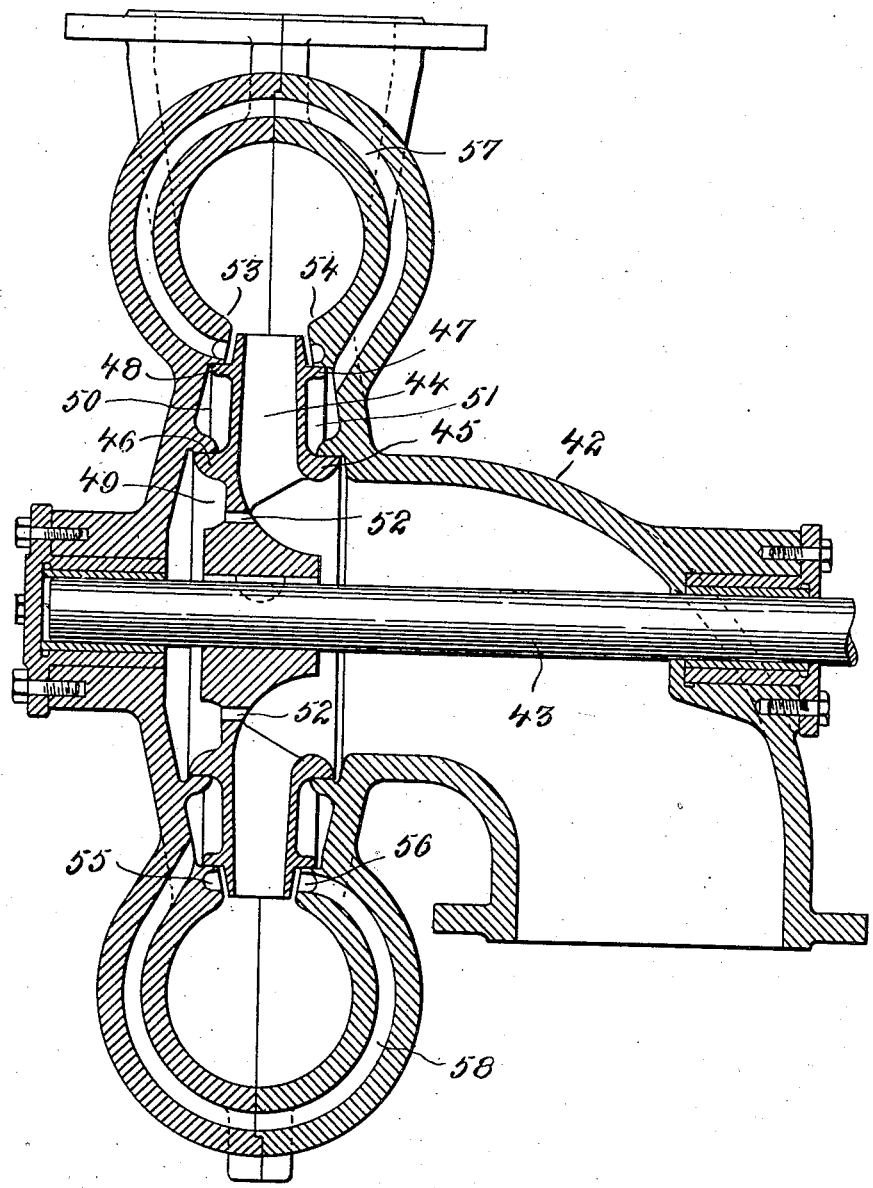

Figure 1 is a vertical longitudinal sectional view of a pump embodying my invention. Fig. 2 is a plan view thereof. Fig. 3 is an end elevation of the pump, a portion of the casing being removed. Fig. 4 is a section of a bearing. Fig. 5 is an end view of the suction end of the pump. Fig. 6 is a longitudinal sectional view of the means for securing an impeller to the shaft and of packing the shaft where it passes through a partition. Fig. 7 is an end elevation of the said means for securing the impeller to the shaft. Fig. 8 is a sectional view showing means for packing the shaft where it passes through the casing. Fig. 9 is a perspective view of the sleeve for securing the impeller to the shaft. Fig. 10 is a transverse sectional view of another embodiment of my invention; and Fig. 11 is a side view of Fig. 10, a portion of the casing being removed.

The object of my invention has been to provide a centrifugal pump having means for automatically balancing the end thrust of the impeller-shaft and overcoming such end thrust, so that the shaft shall run free—that is, without being held in place axially by any other means than pressure of the fluid on either side of the impellers, whereby the friction of thrust-bearings or their equivalents may be eliminated—and to such ends my invention consists in the means for balancing centrifugal pumps hereinafter specified.

In carrying my invention into practice in that embodiment which is illustrated in Figs. 1 to 9, inclusive, I provide a pump which is or may be in all respects other than those hereinafter mentioned the same as that illustrated in the patent granted to me March 13, 1906, No. 814,902. The casing 15 is provided with bearings 16, in which runs a shaft 17, that carries impellers 18. Each impeller has a front and rear ring 19 and 20, respectively, having a running fit with the casing, whereby the water entering the pump is prevented from reaching the sides of the impeller and whereby a chamber 21 is formed at the back of the impellers. The chamber 21 is in communication with the water on the entrance side of the impeller through a slot 22, formed in the sleeve which secures the impeller to the shaft, and thereby the static pressure at the entrance 23 of the impeller is balanced by the static pressure within the chamber 21, since the rings 19 and 20 are of the same diameter. The impeller is provided with front and rear flanges 24 and 25, that form a running fit with flanges formed on the casing, whereby front and rear chambers 26 and 27, respectively, are formed at the sides of the impeller outside or beyond the peripheries of the rings 19 and 20. The water seeks to pass from the exit 28 of the impeller through the chamber 26 down into the suction-pipe of the casing, because the pressure in such suction-pipe is lower than at the exit of the impeller. In order to balance the end thrust formed by the dynamic pressure of the water by striking the entrance 23 of the impeller and striking the surface 29 that deflects it outward, I cause a reduction of the pressure either in the chamber 26 or in the chamber 27 until the impeller is perfectly balanced. This reduction is caused by the jet of water issuing from the impeller and passing between the converging walls 30 and 31, leading to the passage-way to the next impeller. By controlling the size of the passages 32 and 33, formed between the mouth of the impeller and the walls 30 and 31, I am able to control the said suction, as described in the said patent. In order to do this in the present invention annular chambers 34 and 35 are formed outside of the flanges 24 and 25 and communicating with the passages 32 and 33. The chamber 34 communicates by a port 36 with the chamber 26 upon the opposite side of the impeller, and the chamber 35 communicates by a port 37 with the chamber 27 on the opposite side of the impeller therefrom.

In the further description of the invention the chambers 26 and 27 will be termed the "inner" chambers, and the chambers 34 and 35 will be termed the "outer" chambers.

The shaft is provided with bearings which will permit it being shifted longitudinally. The bearing illustrated in Fig. 4 consists of an outer ball-race 38, secured in the bore in the casing and an inner ball-race 39, held against a shoulder on the shaft by lock-nuts 40 and 41.

In the operation of the embodiment of my invention illustrated in Figs. 1 to 9 the pump being in motion the jet of water issuing from the impeller will carry along the water at its sides, and the rotation of the impeller will cause the water adhering to its sides in the chambers 34 and 35 to be thrown with the jet issuing from the impeller, whereby a suction will be created in the said chambers, and the action is such that the narrower the passages 32 and 33 the greater will be the said suction. When the pressure in the chamber 27 forces the impeller with the shaft to the right, as seen in Fig. 1, the exit from the passage 35 will be decreased in width and the suction in the said chamber will be increased; but as the chamber 35 is in communication with the chamber 27 through the bore 37 this endwise movement of the impeller will cause a decrease of the pressure in the chamber 27, and thereby correct its own error. If, on the other hand, the pressure in the chamber 26 is sufficiently great to force the impeller to the left in conjunction with the force of the water flowing into the impeller, then the passage 32 will be decreased and the suction in the chamber 34 will be increased, causing a reduction of pressure in the chamber 26, thereby again correcting and eliminating the end thrust. It will be seen, therefore, that in whatever direction there may be a tendency for the impeller to shift axially outside of its balanced position, or that position where it runs balanced within the pump, an opposite force will be created which tends to lead the impeller to a balanced position. I thus maintain the pump in a balanced position automatically by the action of the water alone and not only eliminate the end thrust and automatically balance the pump, but do so without the addition of any mechanical part.

In Figs. 10 and 11 is illustrated the application of my invention to a single-stage pump, the principle, however, being essentially the same. There is the casing 42, having bearings for the shaft 43, carrying the impeller 44. The impeller has the inner rings 45 and 46 and the outer rings 47 and 48, forming a chamber 49 at the center of the back of the impeller and front and rear inner chambers 50 and 51 along the faces of the impeller. The chamber 49 communicates with the suction side of the impeller by a passage 52, so that the static pressure is balanced. The walls 53 and 54 beside the mouth of the impeller converge, as before, so that the jet of water issuing from the impeller creates a suction in annular chambers 55 and 56 at each side of the mouth of the impeller. The outer chamber 55 communicates by a passage 57 with the inner chamber 51, and the outer chamber 56 communicates by a passage 58 with the inner chamber 50. The action of the pump is the same as that illustrated in Figs. 1 to 9.

Those features which are common to the present case and the application for the reissue of Patent No. 814,902, granted on my application for centrifugal pumps, March 13, 1906, are not claimed herein, but are claimed in said reissue application.

The method which is common to the present case and to my copending application, Serial No. 296,584, filed January 18, 1906, is not claimed in the present application, but is claimed in the said application.

Having thus described this invention, I claim—

1. In a centrifugal pump, the combination of a casing, a shaft, an impeller, and connected means operated by the jet issuing from the impeller for automatically introducing and varying a force for balancing and eliminating the end thrust.

2. In a centrifugal pump, the combination of a casing, a shaft, an impeller, inner and outer chambers formed between the impeller and the casing on both sides of the impeller, and ports connecting the outer chamber of one side with the inner chamber of the opposite side of the impeller.

3. In a centrifugal pump, the combination of a casing, a shaft, an impeller, inner and outer chambers formed between the impeller and the casing on both sides of the impeller, ports connecting the outer chamber of one side with the inner chamber of the opposite side of the impeller, and passages between the impeller and the casing for creating a suction in the outer chambers.

4. In a centrifugal pump, the combination of a casing, a shaft, an impeller, a passage-way in which the mouth of the impeller runs, the walls of said passage-way being contracted in the direction of flow of the water, outer chambers on each side of the impeller and connected with said passage-way, whereby suction is produced in said outer chambers, inner chambers formed between each side of the said impeller and the casing, and ports connecting the outer chamber on one side of the impeller with the inner chamber on the opposite side of the impeller.

5. In a means for balancing the impeller of a centrifugal pump, the combination with an impeller and a casing therefor, between the two of which are formed inner chambers the capacity of which is increasable and decreasable upon movement, laterally, of the impeller relatively to the casing, of peripheral chambers formed in the walls of said casing and which communicate with said first-named chamber through conduit, the latter-named chambers being subjected to enlarging and decreasing outlets as the impeller moves laterally, whereby to change the sucking action at the outlet, and whereby to change the pressure on either side of the impeller.

6. In a centrifugal pump, the combination with means for operating an impeller, said impeller and a casing therefor comprising and forming chambers whose capacity is increased and decreased alternately according to the axial movement of the impeller, means for changing the pressure in said chambers, and conduits whereby the change of pressure is transmitted from said means to said chambers.

7. In a means for balancing the runner of a centrifugal pump, the combination with a casing, of an impeller running therein, by the two of which chambers are formed, the capacity of which is increasable and decreasable according to the movement of the impeller laterally, and conduits leading from the mouths of the impeller to said chamber, whereby to change the pressure in said chambers.

JULIUS DEGEN.

Witnesses:
FRED. W. BARNACLO,
JOHN O. SEIFERT.